1## United States Patent
Shorter et al.

(10) Patent No.: US 9,576,373 B2
(45) Date of Patent: Feb. 21, 2017

(54) GEOSPATIAL IMAGING SYSTEM PROVIDING SEGMENTATION AND CLASSIFICATION FEATURES AND RELATED METHODS

(71) Applicant: Harris Corporation, Melbourne, FL (US)

(72) Inventors: Nicholas Sven Shorter, Melbourne, FL (US); Anthony O'Neil Smith, Melbourne, FL (US); Philip Smith, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 29 days.

(21) Appl. No.: 14/700,289

(22) Filed: Apr. 30, 2015

(65) Prior Publication Data

US 2016/0321818 A1  Nov. 3, 2016

(51) Int. Cl.
| | | |
|---|---|---|
| *G09G 5/02* | (2006.01) | |
| *G06T 7/00* | (2006.01) | |
| *G06K 9/00* | (2006.01) | |
| *G06K 9/62* | (2006.01) | |
| *G06K 9/52* | (2006.01) | |
| *G06T 11/00* | (2006.01) | |
| *G06T 19/00* | (2011.01) | |

(52) U.S. Cl.
CPC ......... *G06T 7/0083* (2013.01); *G06K 9/00476* (2013.01); *G06K 9/52* (2013.01); *G06K 9/6201* (2013.01); *G06K 9/6267* (2013.01); *G06T 11/001* (2013.01); *G06T 19/006* (2013.01); *G06T 2207/30181* (2013.01)

(58) Field of Classification Search
None
See application file for complete search history.

(56) References Cited

U.S. PATENT DOCUMENTS

| | | | |
|---|---|---|---|
| 6,654,690 | B2 | 11/2003 | Rahmes et al. |
| 7,142,984 | B2 | 11/2006 | Rahmes et al. |
| 7,298,891 | B2 | 11/2007 | McDowall et al. |
| 8,244,026 | B2 | 8/2012 | Nahari et al. |

(Continued)

OTHER PUBLICATIONS

Cui et al. A Multi-Pass Generation of DEM for Urban Planning: 2013 International Conference on Cloud Computing and Big Data. pp. 543-548. 2014, IEEE.

(Continued)

*Primary Examiner* — Martin Mushambo
(74) *Attorney, Agent, or Firm* — Allen, Dyer, Doppelt, Milbrath & Gilchrist, P.A.

(57) ABSTRACT

A geospatial imaging system may include a geospatial data storage device configured to store a geospatial dataset including geospatial data points. A processor may cooperate with the geospatial data storage device to determine segments within the geospatial dataset, with each segment including neighboring geospatial data points within the geospatial dataset sharing a common geometric characteristic from among different geometric characteristics. The processor may further determine border geospatial data points of adjacent segments, compare the border geospatial data points of the adjacent segments to determine bare earth segments having respective heights below those of the border geospatial data points of adjacent segments, and classify geospatial data points within each bare earth segment as bare earth geospatial data points.

21 Claims, 6 Drawing Sheets (56) References Cited

U.S. PATENT DOCUMENTS 8,503,761 B2   8/2013   Akbari et al.
8,670,591 B2   3/2014   Mendez-Redriguez et al.

OTHER PUBLICATIONS

Jie, Chen "Practice of airborne LiDAR point cloud filtering method based on triangulated irregular network" 2014 IEEE Workshop on Advanced Research and Technology in Industry Applications (WARTIA). pp. 1284-1286. 2014, IEEE.

GEOSPATIAL IMAGING SYSTEM PROVIDING SEGMENTATION AND CLASSIFICATION FEATURES AND RELATED METHODS

TECHNICAL FIELD

The present invention relates to the field of topography, and, more particularly, to a system and related methods for generating topographical models.

BACKGROUND

Topographical models of geographical areas may be used for many applications. For example, topographical models may be used in flight simulators. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR).

Another similar system from Harris Corp. is LiteSite®. LiteSite® models provide automatic extraction of ground, foliage, and urban digital elevation models (DEMs) from LIDAR and IFSAR imagery. LiteSite® can be used to produce affordable, geospatially accurate, high-resolution 3-D models of buildings and terrain.

Despite the advantages such approaches may provide in certain applications, further advancements may be desirable for classifying and displaying different types of geospatial model data.

SUMMARY

A geospatial imaging system may include a geospatial data storage device configured to store a geospatial dataset including a plurality of geospatial data points. A processor may cooperate with the geospatial data storage device to determine a plurality of segments within the geospatial dataset, with each segment including a plurality of neighboring geospatial data points within the geospatial dataset sharing a common geometric characteristic from among a plurality of different geometric characteristics. The processor may further determine border geospatial data points of adjacent segments, compare the border geospatial data points of the adjacent segments to determine bare earth segments having respective heights below those of the border geospatial data points of adjacent segments, and classify geospatial data points within each bare earth segment as bare earth geospatial data points.

More particularly, the processor may be further configured to perform segment determination training based upon a set of reference segments. By way of example, the processor may include a support vector machine (SVM) configured to perform the segment determination training. Also by way of example, each reference segment may include at least fifty neighboring geospatial data points.

The processor may be further configured to determine a confidence value associated with geospatial data points classified as bare earth geospatial data points. Moreover, the geospatial imaging system may further include a display, and the processor may be configured to display the geospatial data set on the display with the bare earth geospatial data points having different colors, for example, indicating respective confidence values associated therewith. The processor may also be configured to display the geospatial data set on the display with the bare earth geospatial data points having different colors, for example, than non-bare earth geospatial data points.

By way of example, the plurality of different geometric characteristics may include a constant elevation, a common rate of elevation change, etc. The geospatial data points may comprise LIDAR data points, for example.

A related geospatial imaging method may include storing a geospatial dataset including a plurality of geospatial data points in a geospatial data storage device. The method may further include using a processor to determine a plurality of segments within the geospatial dataset, wherein each segment may include a plurality of neighboring geospatial data points within the geospatial dataset sharing a common geometric characteristic from among a plurality of different geometric characteristics. The processor may also be used to determine border geospatial data points of adjacent segments, compare the border geospatial data points of the adjacent segments to determine bare earth segments having respective heights below those of the border geospatial data points of adjacent segments, and classify geospatial data points within each bare earth segment as bare earth geospatial data points.

A related non-transitory computer readable medium may have computer-executable instructions for causing a computer to perform steps including storing a geospatial dataset including a plurality of geospatial data points in a geospatial data storage device, and determining a plurality of segments within the geospatial dataset, where each segment includes a plurality of neighboring geospatial data points within the geospatial dataset sharing a common geometric characteristic from among a plurality of different geometric characteristics. The steps may further include determining border geospatial data points of adjacent the segments, comparing the border geospatial data points of the adjacent segments to determine bare earth segments having respective heights below those of the border geospatial data points of adjacent segments, and classifying geospatial data points within each bare earth segment as bare earth geospatial data points.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
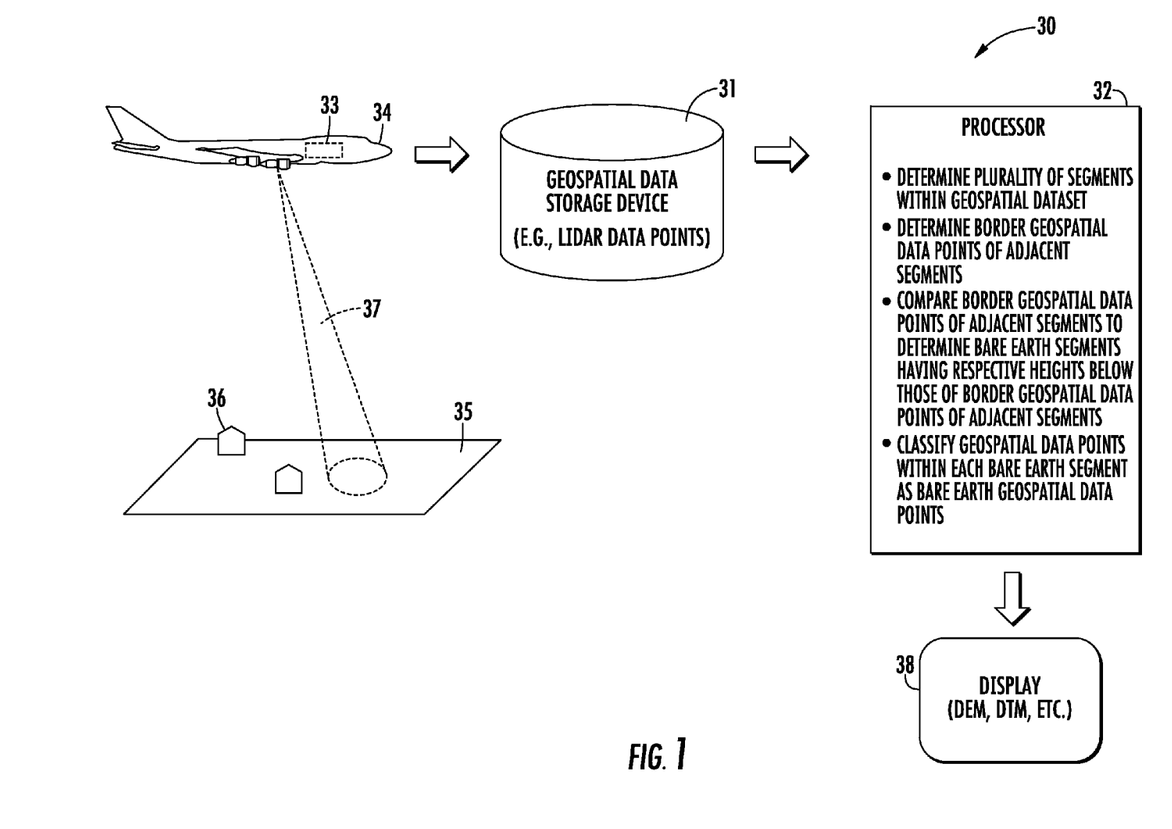
FIG. 1 is a schematic block diagram of a geospatial imaging system in accordance with an example embodiment.
Figure 2:
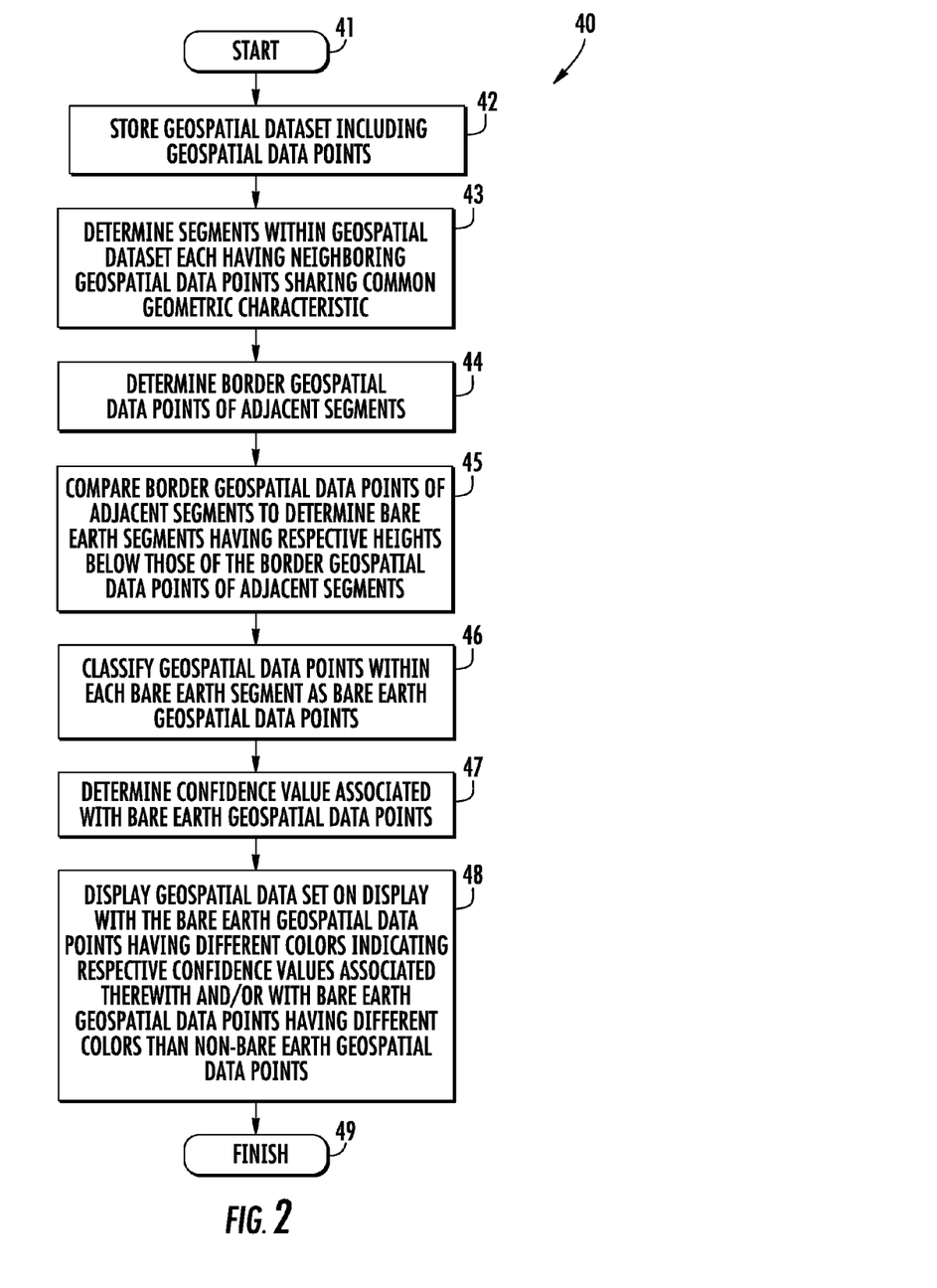
FIG. 2 is a flow diagram illustrating method aspects associated with the geospatial imaging system of FIG. 1.

Referring initially to FIGS. 1 and 2, a geospatial imaging system 30 and associated method aspects are first descried. The system 30 illustratively includes a geospatial data storage device 31 and a processor 32, such as a central processing unit (CPU) of a PC, Mac, or other computing workstation, for example. The geospatial data storage device 31 may be configured to store a geospatial dataset including a plurality of geospatial data points. Generally speaking, the processor 32 may be implemented using appropriate hardware (e.g., a microprocessor) and an associated non-transitory computer-readable medium having computer-executable instructions for performing the noted operations set forth herein. It should also be noted that the processing operations described herein may also be distributed or shared between multiple processing devices, and need not all be performed by a single device in all embodiments, as will be appreciated by those skilled in the art.

The geospatial data points may be captured using a LIDAR device 33. As seen in the example of FIG. 1, a LIDAR device 33 is carried by an airplane 34 and scans terrain with laser light 37 to determine geo-referenced elevation point data from reflected laser light, as will be appreciated by those skilled in the art. However, it should be noted that geospatial data points may be captured by other approaches, such as synthetic aperture radar (SAR) or interferometric SAR (IFSAR), etc., and other airborne platforms (e.g., satellites, UAVs, helicopters, etc.) may also be used as well. As the terrain is scanned, geospatial data points are measured from the returned laser light for bare earth areas 35, as well as non-bare earth areas, which may correspond to foliage, buildings 36, or other man-made structures (e.g., towers, bridges etc.), for example. The processor may generate a three-dimensional (3D) model of the geospatial dataset to be displayed on a display 38, for example, as will be discussed further below.

Beginning at Block 41 of the flow diagram 40, the geospatial data points of the dataset collected by the LIDAR device 33 (or other collection device(s)) may be stored in the geospatial data storage device 31 for processing, at Block 42. More particularly, the processor 32 may determine a plurality of segments within the geospatial dataset, at Block 43. As will be discussed further below, a segment may include a plurality of neighboring geospatial data points within the geospatial dataset sharing a common geometric characteristic from among a plurality of different geometric characteristics. The processor 32 may further determine border geospatial data points of adjacent segments, at Block 44, and compare the border geospatial data points of the adjacent segments to determine bare earth segments having respective heights below those of the border geospatial data points of adjacent segments, at Block 45. The method may further illustratively include classifying geospatial data points within each bare earth segment as bare earth geospatial data points, at Block 46.

Figure 3:
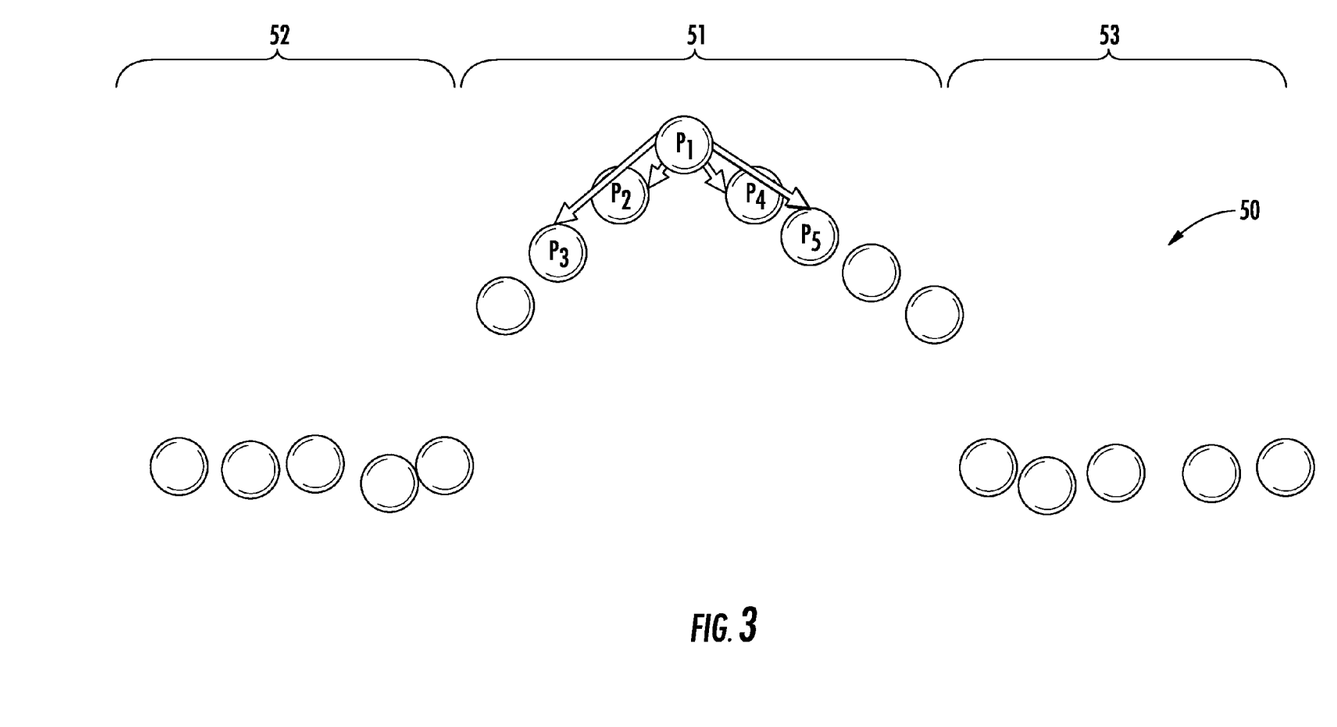
FIGS. 3-5 are a series of schematic geospatial data point cloud diagrams illustrating an example segment determination approach using the system of FIG. 1.
Figure 4:
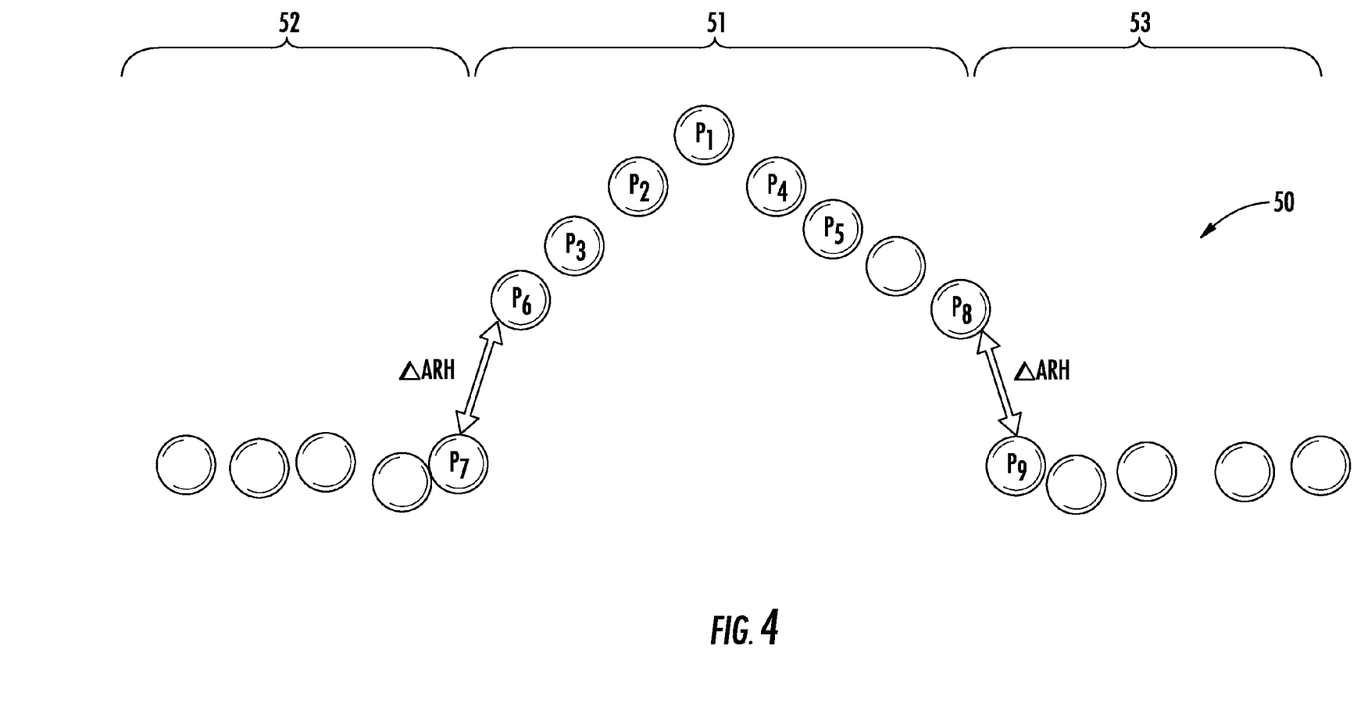
Figure 5:
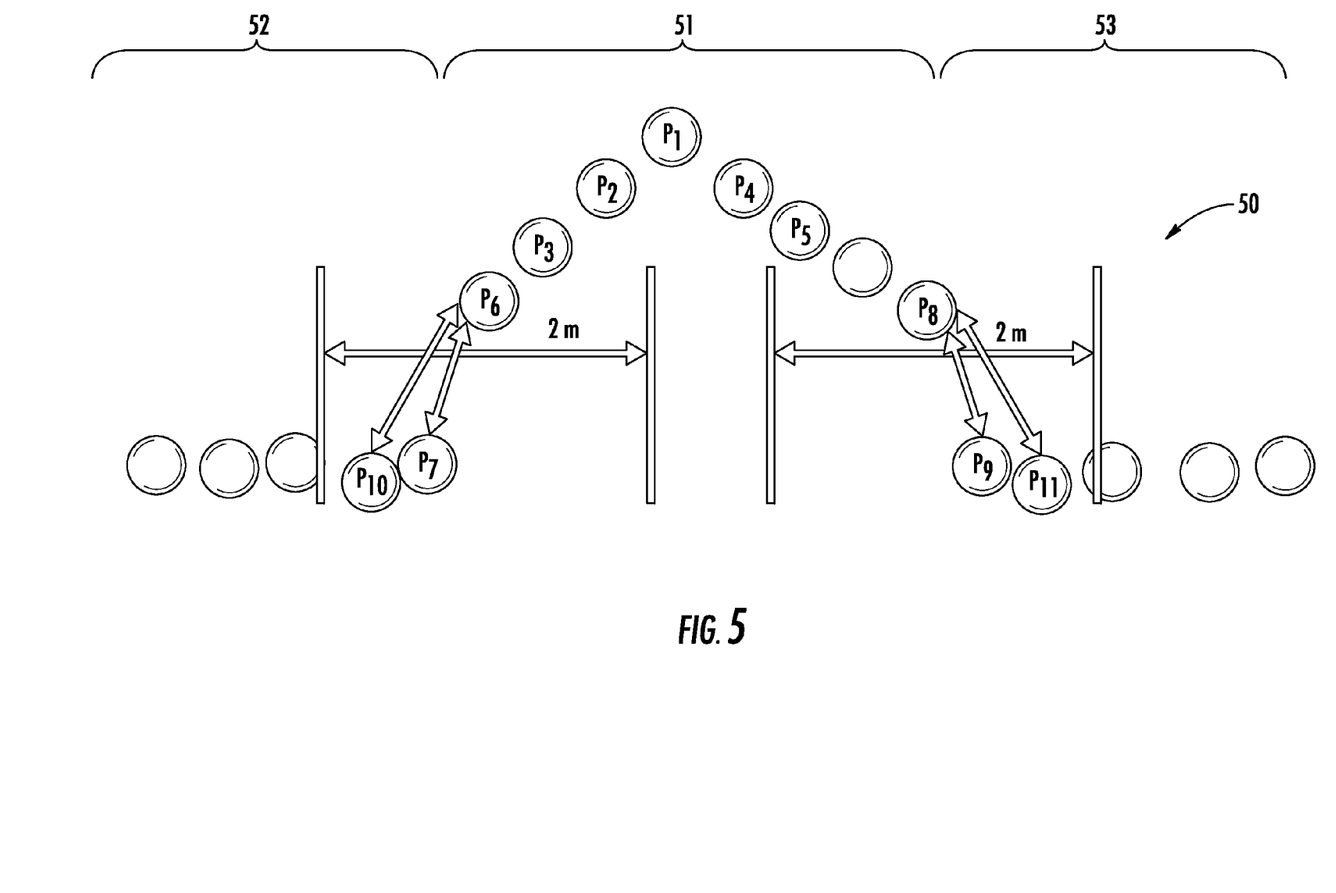

The foregoing will be further understood with reference to an example now described with reference to FIGS. 3-6. In the flow diagram 60 (FIG. 6), an input point cloud of geospatial data points may be collected or provided (Block 61), such as from the LIDAR source 33 as described above, and stored in the geospatial data storage device 31 for processing. FIGS. 3-5 depict a hypothetical profile view of a point cloud 50 including a gable roof house 51 with bare earth regions 52, 53 on the left and right sides of the house, respectively.

Figure 6:
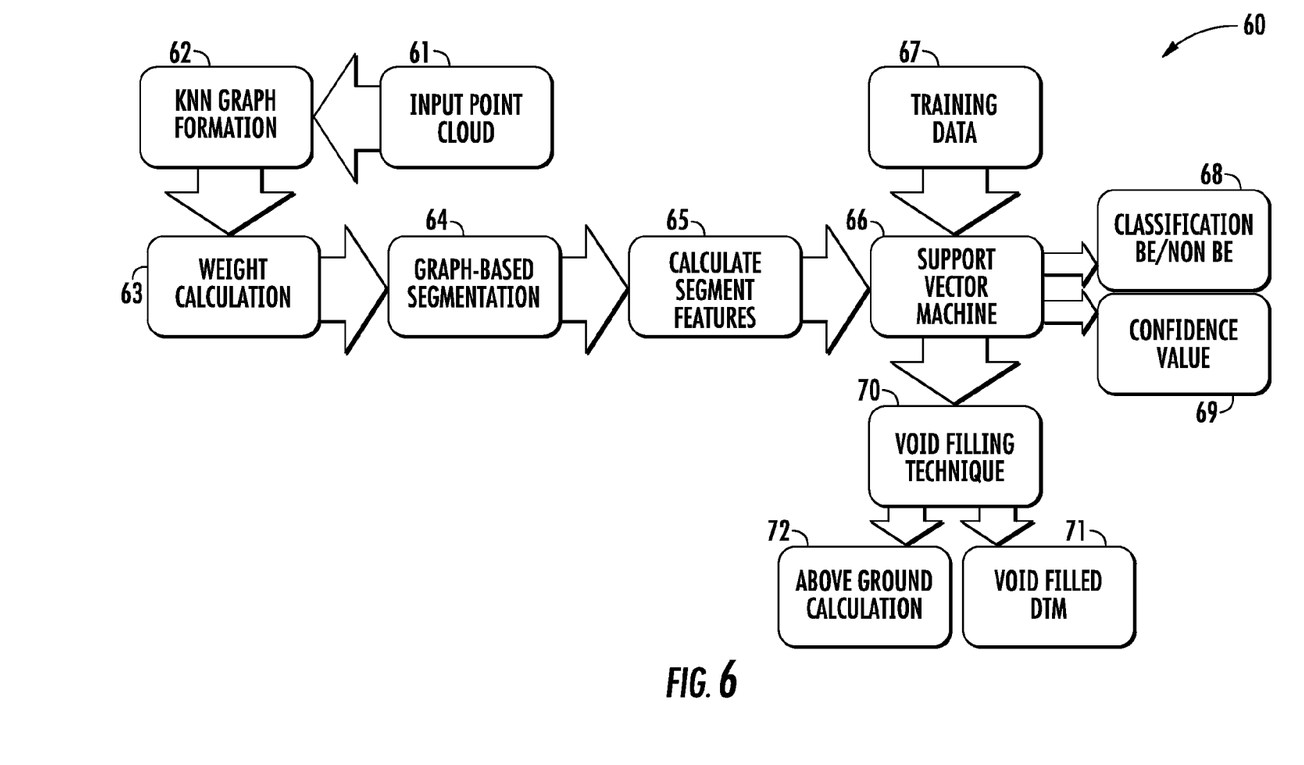
FIG. 6 is a flow diagram illustrating method aspects associated with the segment determination approach of FIGS. 3-5.

In the present example, k nearest neighbor (kNN) graph formation processing is performed (Block 62) to construct a graph from the point cloud 50, where each geospatial data point is a vertex in the graph and edges are formed by connecting a geospatial data point to each of its k nearest neighbors. More particularly, P represents the set of all points within the point cloud 50 as follows:

$$P=\{\langle x_i,y_i,z_i\rangle \mid i\in[1,C]\},$$

where $\langle x_i, y_i, z_i\rangle$ are the three-dimensional coordinates for a point $p_i$, and C is the total number of points in the point cloud. A set of points $N_i$ may include all points connected to point $p_i$. The kNN processing makes connections for all points within the point cloud 50, and the points become vertices for a graph which may be weighted (Block 63) as follows:

$$\omega_{i,j}=|z_i-z_j|,$$

where $\omega_{i,j}$ is the absolute difference in elevation between two geospatial data points i and j connected by a given edge, and $z_i$ and $z_j$ are the elevations of geospatial data points i and j respectively. In the example shown in FIG. 3, the KNN processing looks for the nearest two neighbors to each point in each direction, and accordingly connects points $p_1$ with points $p_2, p_3, p_4$ and $p_5$ as the known nearest neighbors of $p_1$. In other words, the KNN set of points $N_1$ for the point $p_1$ is $\{p_2, p_3, p_4, p_5\}$, as indicated by the associated arrows. It should be noted that in other embodiments different numbers of neighboring points may be included within the set $N_i$ other than two.

After the nearest neighbor points and weights are determined, the points within the point cloud 50 may be segmented using graph-based segmentation (Block 64). Generally speaking, a segment is a group of points which share a common geometric characteristic, such as a constant elevation in the case of the bare earth regions 52, 53, and a common rate of elevation change in the case of the gable roof house 51, as will be appreciated by those skilled in the art. Other common geometric characteristics may also be used in different embodiments.

In the present example, S may represent the set of all segments as follows:

$$s_k \in S \text{ where } k=1,\ldots,\|S\|.$$

A term $B(s_k)$ may represent the set of all border points of a given segment. In the present example, all of the points in the house 51 are grouped as a single segment with boundary points $p_6$ and $p_8$, although in some embodiments the house may be divided into separate segments. Features associated with the segments, such as an average relative height ARH, may then be determined (Block 65) for the given segment as follows:

$$ARH(s_k) = \frac{1}{\|B(s_k)\|} \sum_{i \in B(s_k)} h(i, s_k), \text{ where}$$

$$h(i, s_k) = z_i - z_{j|j \in N_i \cap j \notin s_k}.$$

In the example illustrated in FIG. 4, the difference in elevation ARHs for the house segment and adjacent segments corresponding to the bare earth regions 52, 53 are indicated by the ΔARH arrows.

A percentage of points above neighbors for each segment, $PRH_{high}$, may be determined as follows:

$$PRH_{high}(s_k) = \frac{1}{\|B(s_k)\|} \sum_{i \in B(s_k)} \Phi(i, s_k),$$

where $$\Phi(i, s_k) = \begin{cases} 1 \mid h(i, s_k) > 0 \\ 0 \mid \text{otherwise} \end{cases}.$$

In the example shown in FIG. 4, the segment corresponding to the house 51 has 100% of its border points above neighboring segments for the bare earth regions 52, 53 with respect to elevation.

Another segment feature which may be determined is a segment border disc difference $DD(s_k)$, as follows:

$$DD(s_k) = \frac{1}{\|B(s_k)\|} \sum_{i \in B(s_k)} z_i - \min_z(M_i(s_k)),$$

where $$M_i(s_k) = \left\{ z_j \middle| \begin{array}{l} x_j \leq x_i + 1 \wedge \\ x_j > x_i - 1 \wedge \\ y_j \leq y_i + 1 \wedge \\ y_j > y_i - 1 \wedge \\ j \in N_i \cap j \notin s_k \end{array} \right\}.$$

More particularly, for a given segment's border point i, $$\min_z(M_i(s_k))$$

represents the minimum elevation of all points that do not belong to the given segment $s_k$ and exist within a 2D (horizontal and vertical) one meter radius of that given segment's border point. In the example shown in FIG. 5, point $p_{10}$ exists within a one meter radius from point $p_6$, and is the lowest point, with respect to its elevation, of all points that fall within a one meter radius of point $p_6$. Similarly, point $p_{11}$ exists within a one meter radius of point $p_8$, and has the lowest elevation of all points falling within a one meter radius of point $p_8$. The disc difference for a given segment $DD(s_k)$ is then the sum of the differences between the elevation of each border point and the $$\min_z(M_i(s_k))$$

for those border points.

Using such features determined from a set of reference or training segments, the processor 32 may optionally be trained through machine learning techniques to provide enhanced segment recognition and accuracy. By way of example, the processor 32 may include a support vector machine (SVM) module which is trained based upon the provided training data (Block 67). To help ensure effective training, the training may be performed on features derived from segments which have a purity $U(s_k)$ associated therewith of 90%, i.e., where 90% of the points in that segment have the same truth classification. While it should be noted that other purity percentages may also be used in different embodiments, a relatively high threshold percentage may be desirable in that segments may sometimes bleed over and include both ground and non-ground points, and higher thresholds may help avoid training on those undesired segments having bleed over.

Another feature of training on segmented data is the option to only train on segments that have a minimum number of points therein. By way of example, a minimum training segment point threshold may be at least fifty points, although other threshold numbers of points may be used in different embodiments. Generally speaking, relatively small segments may result in misleading phenomenon, e.g., outliers.

In accordance with one example training configuration, for each segment and the border points of nearby adjacent segments, and the lowest points in elevation within a 2D one-meter radius of each segment's border points that do not belong to that segment, the following segment-based features may be calculated for each segment: (1) the segment's relative height—the average difference between the segment's border points' elevation and connected border points' elevation belonging to different segments; (2) the percentage of border points for a given segment that exist above their neighboring border points belonging to other segments; and (3) the average height difference of the border points for a given segment and the lowest elevation points belonging to another segment and existing within a 2D one-meter radius of the given segment's border points. These features may then be used to train the SVM module 66 to classify geospatial data points within each segment as belonging to either bare earth or non bare earth. It should be noted that less than all three of the above-noted features may be used in some embodiments, and that other potential learning features may also be used in different embodiments.

Using the training data and calculated segment features as input, the SVM module 66 may make classifications between segments, such as bare earth segments and non-bare earth segments (Block 68). This segmentation approach helps preserves mapping to respective points. More particularly, if a segment is classified as bare earth, all of that segment's points may be classified as bare earth. This mapping also enables a performance comparison to other point based classifiers, as will be appreciated by those skilled in the art. By classifying entire segments as having the same type of points (e.g., bare earth or non-bare earth), this may advantageously help analysts simplify the manual touch up process for a resulting terrain model, as will be appreciated by those skilled in the art. As a result, less analyst time may be needed for classifying point clouds, which results in reduced labor costs.

Another optional feature which may be particularly advantageous in some applications is that the SVM module 66 may provide a confidence value indicating a probability or margin of error with respect to whether a point is bare earth or not, at Block 69. The confidence value may be embedded in a field of the model data. That is, the processed geospatial data points may be used to generate a model of the terrain for viewing on the display 38, such as a digital elevation model (DEM) or digital terrain model (DTM), for example, although other forms of models may be used in different embodiments. Generally speaking, the confidence value may represent how probable it is, based upon the classifier used, the training set of reference segments, and the features derived from those segments, that those geospatial data points are bare earth geospatial data points, for example.

By way of example, one file format which may be used for the interchange of 3D point cloud data is the LAS format (although other suitable data formats may also be used). In the LAS format, information such as the above-noted confidence values may be incorporated in a classification field which may be accessible by an analyst. Another option is that the confidence data may be translated to intensity values for respective points that are included in the file format, which would result in the points being displayed with different colors, brightness, etc., based upon their respective confidence levels (see Block 48 of FIG. 2).

By way of example, a first color (e.g., blue) may indicate higher confidence values on the one hand, and a second color (e.g., red) may indicate lower confidence values on the other hand, where confidence values in between high and low probabilities would transition between a dark blue and a dark red, for example (although other color configurations may also be used in different embodiments). This may help an analyst readily identify regions or areas where processing was more difficult due to uneven terrain, etc., and thus what areas may require more manual revision by the analyst, and which areas require little or no attention by the analyst.

It should be noted that other display options for the data may also be provided by the processor 32. For example, coloration or brightness, etc., of geospatial data points may be varied based upon their respective classification as bare earth or non-bare earth data points. That is, bare earth data points may be displayed using one color, and non-bare earth data points may be displayed using another color, at Block 48 of FIG. 2, which concludes the method illustrated therein (Block 49). In accordance with another example, data point classification and confidence values may both be indicated using data coloration and brightness, such as by making bare earth points be of one color family (e.g., blue) and non bare earth data points be of another color family (e.g., red), and the brightness of the points varied in accordance with their respective confidence values.

In some embodiments, void filling may be performed on regions within the geospatial dataset where missing or corrupted data points occur, at Block 70. The associated model (e.g., DTM) with (or without) filled voids may be generated for display, at Block 71, along with associated above-ground processing, at Block 72. Various approaches for generating models and void filling, along with above ground calculation techniques, may be used, as will be appreciated by those skilled in the art. By way of example, one such approach for inpainting data in geospatial models may be found in U.S. Pat. No. 7,750,902 to Rahmes et al., which is assigned to the present Applicant and is hereby incorporated herein in its entirety by reference.

As a result of the above-described approach, the example configurations advantageously allow for geospatial data processing with little or no manual input parameter tuning for different geographical regions. That is, most current approaches have one or more parameters that have to be tuned for different sensors, different collection concept of operations (CONOPS), different terrain types (flat vs. hilly vs. mountainous) or different building types. However, the above-described approach may be more automated without the need for providing such input parameters for different sensor types, etc. More particularly, the above-described approach has been found to be effective across multiple types of data, including both linear mode LIDAR and Geiger mode LIDAR data sets, for example.

Similarly, the above-noted approach may also be effective for different terrain scenarios, including relatively flat regions, mountainous scenes, barrio or dense urban scenes, and mountainous peaks, for example. Similarly, this approach may also be effective for different building structures including barrios, commercial and residential buildings, urban buildings, etc.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial imaging system comprising:
a geospatial data storage device configured to store a geospatial dataset comprising a plurality of geospatial data points; and
a processor cooperating with said geospatial data storage device to
determine a plurality of segments within the geospatial dataset, each segment comprising a plurality of neighboring geospatial data points from among the plurality of geospatial data points within the geospatial dataset sharing a common geometric characteristic from among a plurality of different geometric characteristics,
determine border geospatial data points of adjacent segments,
compare the border geospatial data points of the adjacent segments to determine bare earth segments having respective heights below those of the border geospatial data points of adjacent segments, and
classify geospatial data points within each bare earth segment as bare earth geospatial data points.

2. The geospatial imaging system of claim 1 wherein said processor is further configured to perform segment determination training based upon a set of reference segments.

3. The geospatial imaging system of claim 2 wherein said processor comprises a support vector machine (SVM) configured to perform the segment determination training.

4. The geospatial imaging system of claim 2 wherein each reference segment comprises at least fifty neighboring geospatial data points.

5. The geospatial imaging system of claim 4 further comprising a display; and wherein said processor is configured to display the geospatial data set on the display with the bare earth geospatial data points having different colors indicating respective confidence values associated therewith.

6. The geospatial imaging system of claim 1 wherein said processor is further configured to determine a confidence value associated with geospatial data points classified as bare earth geospatial data points.

7. The geospatial imaging system of claim 1 further comprising a display; and wherein said processor is configured to display the geospatial data set on the display along with the bare earth geospatial data points having different colors than non-bare earth geospatial data points.

8. The geospatial imaging system of claim 1 wherein one of the plurality of different geometric characteristics comprises a constant elevation.

9. The geospatial imaging system of claim 1 wherein one of the plurality of different geometric characteristics comprises a common rate of elevation change.

10. The geospatial imaging system of claim 1 wherein the geospatial data points comprise LIDAR data points.

11. A geospatial imaging method comprising:
storing a geospatial dataset comprising a plurality of geospatial data points in a geospatial data storage device; and
using a processor to
determine a plurality of segments within the geospatial dataset, each segment comprising a plurality of neighboring geospatial data points from among the plurality of geospatial data points within the geospatial dataset sharing a common geometric characteristic from among a plurality of different geometric characteristics,
determine border geospatial data points of adjacent segments,
compare the border geospatial data points of the adjacent segments to determine bare earth segments having respective heights below those of the border geospatial data points of adjacent segments, and
classify geospatial data points within each bare earth segment as bare earth geospatial data points.

12. The method of claim 11 further comprising using the processor to perform segment determination training based upon a set of reference segments.

13. The method of claim 11 further comprising using the processor to determine a confidence value associated with geospatial data points classified as bare earth geospatial data points.

14. The method of claim 13 further comprising using the processor to display the geospatial data set on a display with the bare earth geospatial data points having different colors indicating respective confidence values associated therewith.

15. The method of claim 11 further comprising using the processor to display the geospatial data set on a display with the bare earth geospatial data points having different colors than non-bare earth geospatial data points.

16. The method of claim 11 wherein one of the plurality of different geometric characteristics comprises a constant elevation.

17. The method of claim 11 wherein one of the plurality of different geometric characteristics comprises a common rate of elevation change.

18. A non-transitory computer readable medium having computer-executable instructions for causing a computer to perform steps comprising:
determining a plurality of segments within a geospatial dataset comprising a plurality of geospatial data points, each segment comprising a plurality of neighboring geospatial data points from among the plurality of geospatial data points within the geospatial dataset sharing a common geometric characteristic from among a plurality of different geometric characteristics;
determining border geospatial data points of adjacent the segments;
comparing the border geospatial data points of the adjacent segments to determine bare earth segments having respective heights below those of the border geospatial data points of adjacent segments; and
classifying geospatial data points within each bare earth segment as bare earth geospatial data points.

19. The non-transitory computer readable medium of claim 18 further having computer-executable instructions for causing the computer to perform segment determination training based upon a set of reference segments.

20. The non-transitory computer readable medium of claim 18 further having computer-executable instructions for causing the computer to determine a confidence value associated with geospatial data points classified as bare earth geospatial data points.

21. The non-transitory computer readable medium of claim 20 further having computer-executable instructions for causing the computer to display the geospatial data set on a display with the bare earth geospatial data points having different colors indicating respective confidence values associated therewith.

* * * * *